United States Patent [19]

Obara et al.

[11] 4,041,144
[45] Aug. 9, 1977

[54] PROCESS FOR PREPARING STANNIC OXIDE HYDRATE

[75] Inventors: Isao Obara; Kazuo Yagami, both of Yatsushiro, Japan

[73] Assignee: Kohjin Co., Ltd., Tokyo, Japan

[21] Appl. No.: 575,228

[22] Filed: May 7, 1975

[30] Foreign Application Priority Data

May 10, 1974   Japan .................................. 49-51275

[51] Int. Cl.² ........................................... C01G 19/02
[52] U.S. Cl. .............................. 423/618; 106/15 FP; 252/8.1; 260/29.6 WA
[58] Field of Search ................................ 423/618, 92

[56] References Cited

U.S. PATENT DOCUMENTS

| 824,398 | 6/1906 | Acker | 423/618 |
| 1,529,261 | 3/1925 | Lubowsky | 423/618 |
| 1,682,240 | 8/1928 | Patrick | 423/618 |

FOREIGN PATENT DOCUMENTS

| 29,114 | 1911 | United Kingdom | 423/92 |

OTHER PUBLICATIONS

Handbook of Chemistry and Physics, Forty-Third Edition, pp. 674-675.

*Primary Examiner*—O. R. Vertiz
*Assistant Examiner*—Wayne A. Langel
*Attorney, Agent, or Firm*—Armstrong, Nikaido & Marmelstein

[57] ABSTRACT

A flame resisting agent to be incorporated into an aqueous spinning dope containing chlorine-containing polymer as a main polymer ingredient for improving the flame resistant property of the fiber spun from the spinning dope which includes a stannic oxide hydrate being substantially amorphous with respect to X-ray diffraction and having a bound water in the range of about 0.5 to about 0.7 mole of $H_2O$ per 1 mole of $SnO_2$. The flame resisting agent has a superior dispersibility in an aqueous spinning dope containing chlorine-containing polymer as a main polymer ingredient and the aqueous spinning dope in which the flame resisting agent is incorporated has a superior stability, filtering property and spinning property to give a uniform quality of fibers having a durable, superior flame resistant property.

5 Claims, 2 Drawing Figures

DIFFRACTION ANGLE 2θ (DEGREE)

DIFFRACTION ANGLE 2θ (DEGREE)

DIFFRACTION ANGLE 2θ (DEGREE)

PROCESS FOR PREPARING STANNIC OXIDE HYDRATE

BACKGROUND OF THE INVENTION

The present invention relates to a novel flame resisting agent suitable for improving the flame resistant property of a fiber consisting of chlorine-containing polymer as a main polymer ingredient, particularly a flame resisting agent which has a superior dispersibility in an aqueous spinning dope containing chlorine-containing polymer as a main polymer ingredient and gives an aqueous spinning dope having a superior stability, filtering property and spinning property, from which a fiber having a durable, superior flame resistant property can be obtained and to a process for preparing the same.

Recently, there has been a flame resistant property as one of the important properties commonly required for a variety of synthetic fibers. It has been known to give a flame resistant property to a synthetic fiber made of a chlorine-containing polymer by incorporating antimony trioxide into the polymer. However, antimony trioxide shows a poor dispersibility in an aqueous spinning dope and cannot give the fiber with a sufficient flame resistant property to be required for a flame resistant fiber.

Previously, the present inventors had found that, by incorporating stannic acid into an aqueous spinning dope containing chlorine-containing polymer and polyvinyl alcohol as main polymer ingredients, a durable, good flame resistant property could be obtained in a synthetic fiber spun from the spinning dope (U.S. Patent application Ser. Nos. 242,745 and 513,200). However, stannic acid was liable to lower the stability, filtering property and spinning property of an aqueous spinning dope in which stannic acid was incorporated, and as a result, the fiber spun from the spinning dope has a poor mechanical strength and it was difficult to produce the fiber in a stable condition.

OBJECTS OF THE INVENTION

An object of the present invention is to provide a novel flame resisting agent which is incorporated into an aqueous spinning dope containing chlorine-containing polymer and polyvinyl alcohol as main polymer ingredients without lowering the stability, filtering property and spinning property of the spinning dope to give a good mechanical property and a durable, superior flame resistant property to the fiber spun from the spinning dope.

The other object of the invention is to provide a novel process for preparing a novel flame resisting agent which is incorporated into an aqueous spinning dope containing chlorine-containing polymers and polyvinyl alcohol as main polymer ingredients without lowering the stability, filtering property and spinning property of the spinning dope to give a good mechanical property and a durable, superior flame resistant property to the fiber spun from the spinning dope.

Another object of the invention is to provide an aqueous spinning dope containing chlorine-containing polymer and polyvinyl alcohol as main polymer ingredients, which has a superior stability, filtering property and spinning property, and can give a fiber having a good mechanical property and a durable, superior flame resistant property in a stable production.

Further object of the invention is to provide a fiber made of chlorine-containing polymer and polyvinyl alcohol or partially acetalized polyvinyl alcohol as main polymer ingredients, which has a good mechanical property and a durable, superior flame resistant property.

These and other objects of the invention will become apparent from the description hereinafter.

DETAILED DESCRIPTION OF THE INVENTION

It has now been found that the above-mentioned objects are accomplished by employing, as a flame resisting agent to be incorporated into an aqueous spinning dope containing chlorine-containing polymer and polyvinyl alcohol as main polymer ingredients, a specified stannic oxide hydrate which is substantially amorphous with respect to X-ray diffraction and has a bound water in the range of about 0.5 to about 0.7 mole of $H_2O$ per 1 mole of $SnO_2$.

The stannic oxide hydrate of the present invention has a superior dispersibility in an aqueous spinning dope containing chlorine-containing polymer and polyvinyl alcohol as main polymer ingredients and a superior flame resisting effect.

Generally, a water-insoluble inorganic compound which is to be incorporated into an aqueous spinning dope for a certain purpose is requested to be so finely divided that the spinning property of the spinning dope is not hindered. However, since such a fine particle has a high surface energy potential, and particularly in case the particle is metal oxide or metal hydroxide, the hydroxyl group on its surface is highly reactive, it is liable to enter into combination with other particles, or, in case the main ingredient of the spinning dope is a hydrophilic polymer such as polyvinyl alcohol, with the polymer. This is valid in case the inorganic compound to be incorporated into the spinning dope is stannic acid. That is to say, stannic acid shows a property to aggregate polyvinyl alcohol when added to an aqueous solution of polyvinyl alcohol. Accordingly, when stannic acid is incorporated into an aqueous spinning dope consisting of an aqueous emulsion of chlorine-containing polymer and an aqueous solution of polyvinyl alcohol, it aggregates a part of the spinning dope to lower the stability, filtering property and spinning property thereof. As a result, there frequently occur various disadvantages such as the lowering of the mechanical strength of the fibers prepared by wet-spinning the spinning dope in a solution of salt cake, the difficulty of a stable production of fibers and the lowering of the yield of products. These disadvantageous phenomena are liable to occur with increasing proportion of chlorine-containing polymer to polyvinyl alcohol in the spinning dope.

Figure 1:
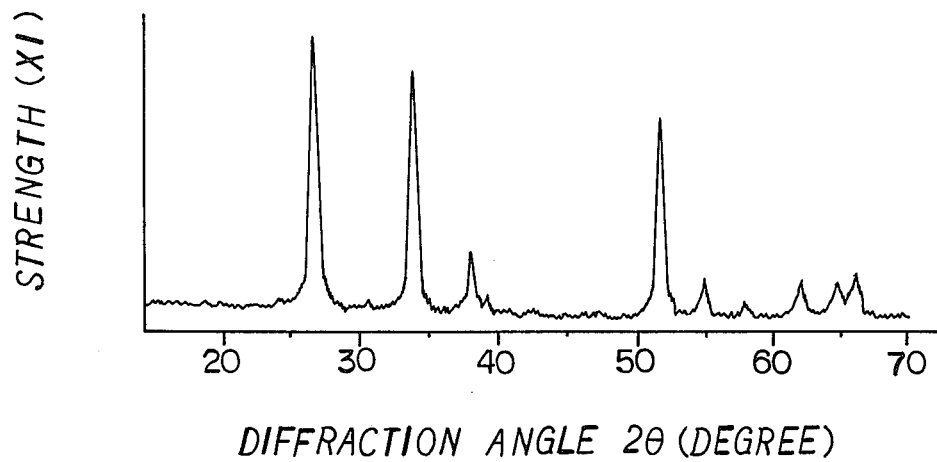
FIG. 1 is a X-ray diffraction diagram of stannic oxide ($SnO_2$)

As a stannic acid, there have been known α-stannic acid and β-stannic acid. α-Stannic acid is expressed by the chemical formula, $SnO_2 \cdot 2H_2O$ and soluble in nitric acid, concentrated sulfuric acid and an aqueous solution of potassium carbonate or potassium hydoxide. It is usually prepared by hydrolyzing an aqueous solution of stannic chloride with an alkali and washing the formed precipitate with water, or by neutralizing an aqueous solution of sodium stannate with an acid and washing the formed precipitate with water. It is difficult to filter an aqueous suspension of α-stannic acid. α-Stannic acid becomes glass-like broken pieces when dried. β-Stannic acid is expressed by the chemical formula, $SnO_2.H_2O$ and insoluble in nitric acid, concentrated sulfuric acid, and an aqueous solution of potassium carbonate or potassium hydroxide. It is usually prepared by heat treating α-stannic acid or by oxidizing a metallic tin with nitric acid at a high temperature and washing the formed precipitate with water. Stannic oxide is prepared by subjecting a metallic tin to combustion in an atmosphere of oxygen or by heating stannic acid at a high temperature. Stannic oxide is a white or light yellow powder having a fairly high hardness and shows sharp peaks in its X-ray diffraction diagram. FIG. 1 is a X-ray diffraction diagram of stannic oxide measured by employing Cu-$K_\alpha$ line monochromated by means of a nickel filter. In the X-ray diffraction diagram, peaks having a strong strength occur at diffraction angles $2\theta$ of 26.6°, 33.9° and 51.8° and peak having a moderate strength occurs at diffraction angle $2\theta$ of 38.0°. These peaks and other peaks show the same lattice spacings as those of X-ray diffraction diagram of tin oxide (Cassiterite) described in ASTM X-ray Powder Data File and therefore it is proved that stannic oxide has a completely tetragonal crystal structure.

Figure 2:
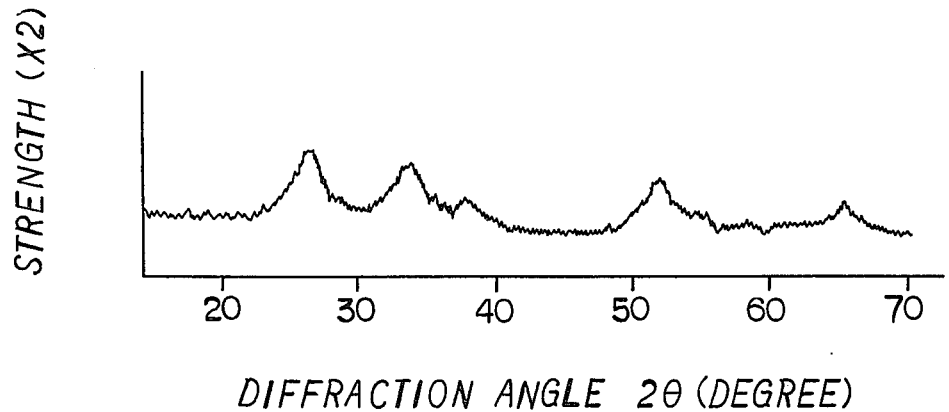
FIG. 2 is a X-ray diffraction diagram of a stannic oxide hydrate ($SnO_2 \cdot 0.55\ H_2O$) of the present invention.

The specified stannic oxide hydrate of the present invention is amorphous with respect to X-ray diffraction and has a bound water in the range of about 0.5 to about 0.7 mole of $H_2O$ per 1 mole of $SnO_2$. It is a substance to be readily crushed up, and is insoluble in water and an aqueous solution of acid or alkali. FIG. 2 is a X-ray diffraction diagram of a stannic oxide hydrate of the present invention. In the X-ray diffraction diagram, peaks are weak and broad, which shows that its crystallites are very small and the substance of the present invention is substantially amorphous. Thus, the stannic oxide hydrate of the present invention is entirely different from the stannic acids which have ever been known and stannic oxide and shows a superior dispersibility in an aqueous spinning dope, compared with the prior stannic acids and stannic oxide.

In the present invention, it is essential to employ the stannic oxide hydrate which is substantially amorphous with respect to X-ray diffraction and has a bound water in the range of about 0.5 to about 0.7 mole of $H_2O$ per 1 mole of $SnO_2$. By employing the specified stannic oxide hydrate, it has been for the first time made possible to obtain an aqueous spinning dope having a superior stability, filtering property and spinning property, which is capable of giving a fiber having a durable, superior flame resistant property in a stable production condition.

The advantages of the present invention will be apparent from the following Table 1. Table 1 shows characteristic properties of aqueous spinning dopes which are prepared by adding 14 parts by weight of aqueous suspensions of a variety of stannic oxide hydrates (containing the stannic oxide hydrate at a concentration of 13% by weight as tin) to a mixture having a temperature of 80° C. of 50 parts by weight of an aqueous emulsion containing 33% by weight of polymers consisting of polyvinyl chloride as a main ingredient and 100 parts by weight of a 18% by weight aqueous solution of polyvinyl alcohol (degree of polymerization: 1,700, degree of hydrolysis: 99.5% by mole).

Table 1

| Stannic oxide hydrate | | spinning dope | | | |
|---|---|---|---|---|---|
| Number of bound water | Crystallinity with respect to X-ray diffraction | Stability | Filtering property (specific KW value | Spinning pressure (kg./cm.$^2$) | Breaking of single filament (strands) |
| 0.0 (stannic Oxide) | Crystalline | Δ | 2.9 | 2.7 | 28 |
| 0.39 | Amorphous | O | 2.3 | 2.0 | 22 |
| 0.48 | Amorphous | O | 1.6 | 1.7 | 5 |
| 0.55 | Amorphous | O | 1.3 | 1.6 | 3 |
| 0.64 | Amorphous | O | 1.2 | 1.7 | 2 |
| 0.71 | Amorphous | O | 1.5 | 2.3 | 4 |
| 0.83 | Amorphous | Δ | 2.0 | 3.4 | 7 |
| 1.0 (β-Stannic acid) | Amorphous | Δ | 3.1 | >5 | 14 |
| Blank | — | O | 1.0 | 1.5 | 2 |

In table 1, bound water is defined as the water contained in the stannic oxide hydrate dried at 105° C. for 3 hours and the number of bound water (X) which is defined as the number of moles of $H_2O$ per 1 mole of $SnO_2$ is determined by the following equation:

$$X = \frac{a - b}{10.82} \div \frac{b}{150.7}$$

wherein $a$ is the weight of the stannic oxide hydrate dried at 105° C. for 3 hours, $b$ is the weight of that which is obtained by further igniting the dried stannic oxide hydrate at 600° C. for 3 hours, 18.02 is the molecular weight of water ($H_2O$), and 150.7 is the molecular weight of stannic oxide ($SnO_2$). In the instant specification, stannic oxide hydrate is sometimes expressed by the chemical formula $SnO_2.XH_2O$ wherein X means the number of bound water defined above.

The stability of the spinning dope is estimated by judging the changes of qualities of the spinning dope due to the destruction of the emulsion or the gelation of polyvinyl alcohol from the facts as to whether the viscosity of the spinning dope increases with the lapse of time or whether any phase-separation occurs in the spinning dope. The mark O means that there occurs substantially no increase with the lapse of time in the viscosity and the mark Δ means that there occurs substantially some increase with the lapse of time in the viscosity.

The filtering property is represented by a specific KW value which is a relative value of the KW value of the spinning dope containing a stannic oxide hydrate, which is determined according to a constant pressure-filtering method empolying a pressure of 2 kg./cm.$^2$ and Polyfron Paper (resistered trade mark, made by Toyo Roshi Kaisha Ltd.) having an average pore size of 20 μ as a filter material, to the KW value of the spinning dope containing no stannic oxide hydrate. In case the specific KW value is large, the amount of the liquid to be filtered per unit area of a filter material decreases to cause the frequent exchanges of the filter material, and further the spinning property is lowered and the quality of the fiber obtained is poor. Thus, a large specific KW value is disadvantageous from viewpoints of operating efficiency in the production of fibers and economical aspect.

The spinning pressure (kg./cm.$^2$) is the value at the time after 3 hours from the starting of spinning. A low spinning pressure is favorable and it is usually difficult to spin film continuously for a long time from a spinning dope of which spinning pressure becomes more than 2.5 kg./cm.$^2$ at the time after 3 hours from the starting of spinning.

Many occurrences of the breaking of single filament are undesirable since the formation rate of the irregularities of tows increases so that the stable production of fibers is hindered and the yield of fibers having a uniform quality is decreased.

From Table 1, it is clear that the stannic oxide hydrate which is amorphous with respect to X-ray diffraction and has a bound water in the range of about 0.5 to about 0.7 mole of $H_2O$ per 1 mole of $SnO_2$ can give a stable aqueous spinning dope of which spinning condition is stable so that a uniform quality of fibers can be produced stably and economically in an industrial scale.

The specified stannic oxide hydrate of the present invention is preferably prepared by wet-heat-treating $\beta$-stannic acid in a humid atmosphere.

$\beta$-Stannic acid of a starting material is not critical and every one prepared according to a variety of processes can be employed. For instance, there are exemplified $\beta$-stannic acids prepared by oxidizing a metallic tin with nitric acid in a high temperature, by hydrolyzing stannic chloride with an alkali and by heat-treating $\alpha$-stannic acid. Generally, however, $\beta$-stannic acid prepared by oxidizing a metallic tin with nitric acid is more preferably employed.

Usually, $\beta$-stannic acid employed is preferably to be free from impurities such as water-soluble inorganic salts. A great amount of such impurities lowers the stability of an aqueous spinning dope and therefore, it is preferable that the amount of impurities is not more than 2% by weight to that $\beta$-stannic acid.

Generally, $\beta$-stannic acid has a wide range of free water which is defined as the water evaporated by drying $\beta$-stannic acid at 105° C. for 3 hours. The content of the free water which is hereinafter referred to as "free water content" is determined as in the following: $\beta$-stannic acid of which the impurities such as water-soluble inorganic salts are fully removed is dehydrated according to a process for determining swelling rate with water described in JIS L 1015 (Method for testing rayon staple) except that $\beta$-stannic acid is placed on Polyfron Paper having an average pore size of 20 $\mu$ which is laid on a wire-netting made of stainless steel positioned in a centrifuge tube. Then, the dehydrated $\beta$-stannic acid is dried at 105° C. for 3 hours. The free water content (% by weight) is calculated from the following equation:

$$\text{Free water content (\% by weight)} = \frac{\text{(Weight before drying)} - \text{(Weight after drying)}}{\text{Weight after drying}} \times 100$$

The free water content of $\beta$-stannic acid is greatly affected by the conditions for preparing $\beta$-stannic acid. For instance, in case of preparing $\beta$-stannic acid by oxidizing metallic tin with nitric acid, the free water content of the obtained $\beta$-stannic acid becomes low with elevating reaction temperature. $\beta$-Stannic acid having a high free water content is liable to sinter during the wet-heat-treatment to give rough particles or hard particles, so that it becomes difficult to carry out the wet-heat-treatment uniformly and a great power is required to carry out the mixing during the wet-heat-treatment, and furthermore it becomes difficult to practice the pulverization which is carried out after the wet-heat-treatment in case of need in order to make the particles of the obtained stannic oxide hydrate to be small. Accordingly, the free water content of $\beta$-stannic acid is preferably within the range of b 5 to 70% by weight, more preferably within the range of 10 to 50% by weight.

The wet-heat-treatment is preferably carried out by heating a slurry of $\beta$-stannic acid which is regulated to a solid concentration of 30 to 60% by weight, with mixing in an acid condition in a humid atmosphere. The solid concentration of the slurry of $\beta$-stannic acid is defined as the percentage of the weight of $\beta$-stannic acid in the slurry to the whole weight of the slurry, wherein the weight of $\beta$-stannic acid in the slurry is based upon $\beta$-stannic acid dried at 105° C. for 3 hours. In case the pH value of the slurry during the wet-heat-treatment is neutral or alkaline, the viscosity of the slurry of the obtained stannic oxide hydrate increases abnormally during the wet-grinding which is carried out after the wet-heat-treatment in case of need. Accordingly, it is preferable that the pH value of the slurry during the wet-heat-treatment is acidic. More preferable pH value ranges from about 2 to about 4.5. The desirable acid condition of the slurry during the wet-heat-treatment may be achieved by regulating the pH value of $\beta$-stannic acid to a desirable value. In this specification, the pH value of the slurry is one determined by sampling a part of the slurry, diluting the sample with water so that the solid concentration is 20 % by weight, and measuring the pH value of the resultant with a pH meter. As the humidity of atmosphere, a humidity of not less than 0.5 kg. of steam/1kg. of dry air is preferable. In case the humidity of the atmosphere is less than the above range, $\beta$-stannic acid is too rapidly dried to make it difficult to wet-heat-treatment $\beta$-stannic acid uniformly. Accordingly, it is impossible to obtain a uniform quality of the stannic oxide hydrate in a stable condition. The desirable humid atmosphere is readily obtained by regulating the amount of heat to be supplied, the amounts of air and steam to be supplied and the amount of steam to be exhausted in a closed system. The wet-heat-treatment is preferably carried out at a temperature in the range of 80° to 130° C. In case the temperature is less than 80° C., the effect of the wet-heat-treatment can not be fully achieved. In case the temperature is more than 130° C., a rapid drying occurs so that it becomes impossible to regulate the bound water content of the stannic oxide hydrate and hard particles of the stannic oxide hydrate are partially formed. As the period for the wet-heat-treatment, a period in the range of 3 to 16 hours is preferably adopted.

The stannic oxide hydrate obtained by the wet-heat-treatment has a wide range of free water content, depending upon the conditions of the wet-heat-treatment.

The term "free water content" is employed in the same meaning as that of β-stannic acid being the starting material. The free water content of the stannic oxide hydrate has a relation with the bound water content of the stannic oxide hydrate as well as the dispersibility of the stannic oxide hydrate in an aqueous spinning dope. Usually, a free water content of 5 to 25% weight, more preferably of 7 to 15% by weight is adopted. In case the free water content is more than the above range, an aqueous dispersion of the stannic oxide hydrate which is to be added to an aqueous spinning dope is liable to have a high viscosity and the dispersibility of the stannic oxide hydrate in the spinning dope is lowered. In case the free water content is less than the above range, the particles of the stannic oxide hydrate is so hard that it is impossible to obtain a uniform aqueous dispersion of the stannic oxide hydrate.

In the most preferable embodiment of the present invention, the stannic oxide hydrate is prepared by employing as a starting material β-stannic acid having a free water content of 5 to 70% by weight, preferably 10 to 50% by weight which is prepared by oxidizing metallic tin with nitric acid at a high temperature and washing the resultant with water to fully remove the impurities; regulating a slurry of the β-stannic acid to a solid concentration of 30 to 60% by weight and an acid condition, preferably a pH value of about 2 to about 4.5; heating the slurry of the β-stannic acid with mixing at a temperature of 80° to 130° C. in a humid atmosphere having a humidity of not less than 0.5 kg. of steam/1 kg. of dry air so that the free water content of the stannic oxide hydrate to be obtained is within the range of 5 to 25% by weight, more preferably of 7 to 15% by weight.

The stannic oxide hyrate obtained by the wet-heat-treatment, if its particle size is too large, may be pulverized by means of a wet grinder such as a sand grinder in case of need in order to make the dispersibility of the stannic oxide hydrate in an aqueous spinning dope good. The average particle size of the stannic oxide hydrate is preferably within the range of 0.4 to 1 $\mu$, more preferably within the range of 0.4 to 0.5 $\mu$. The stannic oxide hydrate having an average particle size in the above range is not readily sedimented in its aqueous dispersion and its 20% by weight aqueous dispersjion has a viscosity of 150 to 300 cP.

The aqueous spinning dope to which the stannic oxide hydrate of the present invention is preferably applied is that containing a chlorine-containing polymer and polyvinyl alcohol as main polymer ingredients.

The examples of the chlorine-containing polymer include homopolymers of chlorine-containing polymerizable monomers such as vinyl chloride and vinylidene chloride, copolymers of more than two of the monomers, copolymers of each of the above monomers and other polymerizable monomers such as vinyl acetate, vinyl propionate, acrylonitrile, vinyl acrylate, diallyl phthalate and divinylbenzene, and chlorinated polymers such as chlorinated polyethylene, chlorinated polypropylene and chlorinated polyvinyl chloride. These polymers may be employed alone or in combination. The chlorine-containing polymer may be employed in a form of its aqueous emulsion or its powder, provided that it can be dispersed uniformly into water. Generally, however, such a stable aqueous emulsion of a chlorine-containing polymer as described in U.S. Pat. No. 3,111,370 and U.S. Patent Application Serial No. 416,801 is preferably employed. Such an aqueous emulsion is prepared by emulsion-polymerizing a chlorine-containing polymerizable monomer in the presence of polyvinyl alcohol or polyvinyl alcohol having sulfonic acid group, an emulsifying agent and a polymerization initiator. The polyvinyl alcohol or polyvinyl alcohol having sulfonic acid group employed has a preferable degree of polymerization of 100 to 1,000. The polyvinyl alcohol having sulfonic acid group contains preferably 0.5 to 20% by mole of sulfonic acid group. Examples of the emulsifying agents include anionic surface active agents such as sulfates of higher alcohols, alkylarylsulfonic acids and sodium salts of higher fatty acids. These anionic surface active agents may be employed alone or in combination with each other, or in combination with a nonionic surface active agent such as polyethylene glycol alkyl ethers or polyethylene glycol alkylaryl ethers. The examples of the polymerization initiators include potassium persulfate, ammonium persulfate, hydrogen peroxide and water-soluble organic peroxides. These polymerization initiators are employed alone or in combination with a reductant such as sodium bisulfite or ferrous chloride. The emulsion contains as polymer ingredients a homopolymer of the chlorine-containing polymerizable monomer, unreacted polyvinyl alcohol or polyvinyl alcohol having sulfonic acid group, and a graft polymer in which a part of the chlorine-containing polymerizable monomer is grafted onto the polyvinyl alcohol or polyvinyl alcohol having sulfonic acid group. The proportion of the homopolymer of the chlorine-containing polymerizable monomer, the proportion of the unreacted polyvinyl alcohol or polyvinyl alcohol having sulfonic acid group and the proportion of the graft polymer in the aqueous emulsion are preferably within the ranges of 93.0 to 48.5% by weight, of 3.2 to 0.5% by weight and of 49.8 to 5.0% by weight, respectively, to the total amount of the solids in the aqueous emulsion. The concentration of the solid in emulsion is preferably within the range of 25 to 35% by weight. The ratio of the amount of the grafting chlorine-containing polymer unit and the amount of the polyvinyl alcohol or polyvinyl alcohol having sulfonic acid group in the graft polymer is preferably within the range of 92 : 8 to 8 : 20 : 80 by weight. Vinyl chloride is preferably employed as a chlorine-containing monomer for obtaining the aqueous emulsion.

As the polyvinyl alcohol of one of main polymer ingredients in an aqueous spinning dope, a polyvinyl alcohol having a degree of polymerization of about 900 to about 2,500 and a degree of hydrolysis of not less than 95% by mole is preferably employed.

In an aqueous spinning dope consisting of a chlorine-containing polymer and polyvinyl alcohol as main polymer ingredients, preferable ratio of the chlorine-containing polymer and polyvinyl alcohol is within the range of 40 : 60 to 60 : 40 by weight. In case the amount of the chlorine-containing polymer is less than the above range, the flame-resisting effect of the stannic oxide hydrate is not fully exhibited in the fiber prepared from the spinning dope according to a conventional method. In case the amount of the chlorine-containing polymer is more than the above range, the filtering property of the spinning dope is lowered and the breaking of single filament increases, particularly in case the amount of the stannic oxide hydrate added is much. Accordingly, it is impossible to produce fibers efficiently and economically.

The amount of the stannic oxide hydrate added to the aqueous spinning dope mentioned above varies widely depending upon the ratio of chorine-containing polymer and polyvinyl alcohol and the degree of flame resistant property required for the obtained fiber. Generally, however, the amount of the stannic oxide hydrate added is within the range of about 0.5 to about 5% by weight as tin, more preferably about 1 to about 3.5% by weight as tin, to the total amount of the polymers employed. In case the amount of the stannic oxide hydrate is less than the above range, it is difficult to obtain a sufficient flame resistant property to be requested for a flame resistant fiber. In case the amount of the stannic oxide hydrate is more than the above range, the mechanical properties of the fiber prepared from the spinning dope according to a conventional method are liable to be lowered.

The amount of water in the aqueous spinning dope mentioned above also varies widely. Generally, however, preferable amount of water ranges from about 70 to about 85% by weight to the total amount of the spinning dope.

The stannic oxide hydrate of the present invention has a more effective flame resisting effect than that of antimony trioxide. For instance, comparing the flame resistant property of two kinds of fibers spun from two kinds of aqueous spinning dopes which contain the same amounts of the stannic oxide hydrate and antimony trioxide (as metal), respectively, the fibre containing the stannic oxide hydrate shows a considerably higher oxygen index (provided in ASTM-D-2863) than that of the fiber containing antimony trioxide.

The present invention is more particularly described and explained by means of the following illustrative Examples.

EXAMPLE 1

A metallic tin having a comparatively wide surface was added to a 33.5% by weight nitric acid maintained at 100° C. and the resultant was agitated at a temperature of not less than 100° C. for 6 hours to oxidize sufficiently the metallic tin. The obtained aqueous suspension was regulated to pH 3 with an aqueous ammonia. The precipitate was washed with water by repeating decantation and the last supernatant was sufficiently removed to give a slurry of $\beta$-stannic acid having a solid concentration of 40% by weight. The $\beta$-stannic acid in the slurry had a free water content of 39% by weight and an impurity content of 0.9% by weight.

The obtained slurry of $\beta$-stannic acid was fed into a closed kettle provided with an agitator and a steam jacket and subjectd to wet-heat-treatments under various conditions. The humidity in the kettle was regulated by determining the amounts of steam and air exhausted from the kettle and regulating the amounts of heated steam and air to be fed into the kettle. The pH value, the treatment temperature, the treatment period and the humidity employed in the wet-heat-treatment are shown in Table 2. Thus, stannic oxide hydrates having various bound water contents were prepared.

The obtained stannic oxide hydrates and $\beta$-stannic acid employed as a starting material were pulverized by means of a sand grinder for 8 hours. The pulverized substances were subjected to the determination of average particle sizes.

Then, the pulverized substances were subjected to the determinations of aggregating property and filtering property as to an aqueous solution of polyvinyl alcohol. The results are shown in Table 2.

In Table 2, the average particle size ($\mu$) was determined with a light-transmission type device for determining particle size distribution by centrifugal sedimentation (SKN model made by Seishin Kigyo Kabushiki Kaisha). As a dispersing agent, a 2% by weight aqueous solution of sodium tripolyphosphate was employed.

The aggregating property was estimated as follows: 100 parts by weight of a 15% by weight aqueous dispersion of the stannic oxide hydrate (or $\beta$-stannic acid) and 15 parts by weight of 10% by weight aqueous solution of polyvinyl alcohol having a degree of polymerization of 1,700 and a degree of hydrolysis of 98.5% by mole were admixed and heated with agitation at 145 r.p.m. at 80° C. for 2 hours. The resultant was diluted with distilled water to give a sample solution. The particle size distribution of the sample solution was determined by the above-mentioned device for determining particle size distribution. From the obtained particle size distribution, there was calculated the average particle size of the particles in the sample solution (hereinafter referred to as "average particle size of aggregated PVA") and the weight fraction of particles having a particle size of not less than 20 $\mu$ among the whole particles in the sample solution (hereinafter referred to as "weight fraction of particles $\geq$ 20 $\mu$").

The filtering property was estimated as follows: 100 Parts by weight of a 16% by weight aqueous solution of polyvinyl alcohol having a degree of polymerization of 1,700 and a degree of hydrolysis of 98.5% by mole and 5 parts by weight of a 16% by weight aqueous dispersion of the stannic oxide hydrate were admixed and heated with agitating at 80° C. for 3 hours to give a sample solution. The obtained sample solution was filtered according to a constant pressure-filtering method employing a pressure of 2 kg./cm$^2$. and Polyfron Paper having an average pore size of 20 $\mu$ and at the same time KW value was determined. Small KW value means that filtering property is good and hence operating efficiency is high.

Table 2

| Experiment | | 1 | 2 | 3 | 4 | 5 | 6 | 7 ($\beta$-stannic acid) |
|---|---|---|---|---|---|---|---|---|
| | pH | 3.0 | 3.2 | 2.8 | 3.0 | 3.2 | 2.8 | — |
| Wet-heat- | Temperature (° C.) | 130 | 130 | 120 | 120 | 100 | 85 | — |
| treatment | Period (hr.) | 16 | 10 | 10 | 6 | 4 | 3 | — |
| | Humidity (kg. of steam/1 kg. of dry air) | 2.0 to 10.0 | 2.0 to 10.0 | 2.0 to 10.0 | 2.0 to 10.0 | 0.7 to 1.5 | 0.5 to 1.0 | — |
| Number of bound water | | 0.39 | 0.48 | 0.55 | 0.64 | 0.71 | 0.83 | 1.0 |
| Averge particle size ($\mu$) | | 0.81 | 0.48 | 0.45 | 0.42 | 0.43 | 0.41 | 0.40 |
| Aggregating property | Average particle size of aggregated PVA ($\mu$) | 12 | 5.4 | 4.5 | 4.9 | 6.8 | 13 | 25 |
| | Weight fraction $\geq$20$\mu$ of particles (% by weight) | 29 | 15 | 8 | 11 | 17 | 33 | 65 |
| Filtering property (KW value) | | 270 | 180 | 120 | 100 | 110 | 150 | 210 |

As shown in Table 2, in case of the stannic oxide hydrate having a number of bound water less than about 0.5, its pulverizing property is poor to lower its production efficiency, and the filtering property of the aqueous solution of polyvinyl alcohol admixed with the stannic oxide hydrate is poor and average particle size of aggregated PVA is large. In case of the stannic oxide hydrate having a number of bound water of more than about 0.7, average particle size of aggregated PVA is large and the filtering property is poor. Accordingly, the condition that the number of bound water of stannic oxide hydrate is within the range of about 0.5 to about 0.7 is essential for obtaining a stannic oxide hydrated having a good dispersibility.

EXAMPLE 2

Stannic chloride was added to a 5% aqueous solution of sodium carbonate maintained at 20° C. till the pH value of the resultant became 4. During the procedure, stannic chloride was hydrolized to give a precipitate. The resultant containing the precipitate was heated with agitation at 100° C. for 8 hours and then cooled. The precipitate was sufficiently washed water to remove impurities such as water-soluble inorganic salts. Thus obtained β-stannic acid had a free water content of 83% by weight.

The above procedure was repeated except that stannic chloride was added to the solutions of sodium carbonate maintained at 50° C. and 100° C. to give β-stannic acids having free water contents of 62% by weight and 35% by weight, respectively.

Each β-stannic acid obtained was fed into the kettle and the slurry of the β-stannic acid was regulated to a solid concentration of 40% by weight and a pH value of 3.8. Then, the β-stannic acid was wet-heat-treated under the conditions shown in Table 3 and the obtained stannic oxide hydrate was wet-grinded by the same manner as in Example 1. Thus, there were prepared three kinds of stannic oxide hydrates having numbers of bond water of 0.45, 0.65, and 0.57, respectively. In the wet-heat-treatment, power needed for wet-heat-treatment was determined. Power needed for wet-heat-treatment means, in case of wet-heat-treating a constant amount of β-stannic acid having a certain free water content in the kettle, a ratio of the maximum amperes needed for driving the motor of the agitator to that of β-stannic acid having a free water content of 35% by weight.

The average particle size of the stannic oxide hydrate, and the aggregating property of polyvinyl alcohol solution admixed with the stannic oxide hydrate were determined by the same manner as in Example 1.

The results are shown in Table. 3.

As shown in Table 3, in case of β-stannic acid having a free water content of more than 70% by weight, a great power for driving the agitator is needed in the wet-heat-treatment, and rough particles are formed during the wet-heat-treatment to make uniform wet-heat-treatment impossible and the obtained particles are hard. As a result, the particle sizes of wet-grinded paticles are large. Furthermore, the aggregating property is high. Accordingly, it is preferable that the free water content of β-stannic acid of starting material is not more than 70% by weight.

EXAMPLE 3

Into an autoclave were supplied 32 parts by weight of vinyl chloride, 2 parts by weight of polyvinyl alcohol having a degree of polymerization of 500 and a degree of hydrolysis of 99.9% by mole, 0.07 part by weight of potassium persulfate, 0.9 parts by weight of sodium lauryl sulfate and 65 parts by weight of demineralized water. The mixture was agitated at 45° C. for 6 hours to give an aqueous emulsion containing as main polymer ingredients a homopolymer of vinyl chloride and a graft polymer in which a part of vinyl chloride was grafted to polyvinyl alcohol (the concentration of the total polyvinyl chloride component including the polyvinyl chloride unit in the graft polymer in the emulsion: 30% by weight, the concentration of the vinyl chloride homopolymer in the emulsion: 26.9% by weight, the concentration of the graft polymer in the emulsion: 4.7% by weight, the ratio of the amount of the grafting polyvinyl chloride unit and the amount of the polyvinyl alcohol in the graft polymer: 66 : 34 by weight).

To 300 parts by weight of the aqueous emulsion were added 467 parts by weight of a 18% by weight aqueous solution of polyvinyl alcohol having a degree of polymerization of 1,650 and a degree of hydrolysis of 99.5% by mole and 30 parts by weight of a slurry of the stannic oxide hydrate ($SnO_2 \cdot 0.63\ H_2O$) prepared in Example 1 (the concentration of the stannic oxide hydrate: 12% by weight as tin) to give an aqueous spinning dope of 78° C. The stability of the spinning dope was good and the filtering property of the spinning dope was also good (the specific KW value: 1.1).

The spinning dope was extruded into a solution of salt cake. In that case, the spinning condition was preferable. That is to say, the spinning pressure was 1.5 kg./cm.$^2$ and the breaking of single filament occured scarcely. The spun filaments were successively passed through a saturated solution of salt cake maintained at 95° C. and washed with water. After dried, the filaments are subjected to heat stretching and heat treatment to give filaments consisting of polyvinyl chloride, Table 3

| Experiment | | 1 | 2 | 3 |
|---|---|---|---|---|
| β-Stannic acid | Temperature for hydrolysis (° C.) | 20 | 50 | 100 |
| | Free water content (% by weight) | 83 | 62 | 35 |
| Wet-heat treatment | Temperature (° C.) | 120 | 120 | 120 |
| | Period (hr.) | 16 | 8 | 10 |
| | Humidity (kg. of steam/1 kg. of dry air) | 2.0 to 10.0 | 2.0 to 10.0 | 2.0 to 10.0 |
| | Power needed for wet-heat-treatment | 2.6 | 1.4 | 1.0 |
| | Number of bound water | 0.45 | 0.65 | 0.57 |
| | Average particle size (μ) | 0.61 | 0.48 | 0.43 |
| Stannic oxide hydrate | Average particle size of aggregated PVA (μ) | 23 | 6.5 | 4.3 |
| | Weight fraction of particles ≧20 μ (% by weight) | 55 | 18 | 8 | polyvinyl alcohol and stannic oxide hydrate [50 : 50 : 2 (as tin) by weight].

The filaments were dipped in an acetalization bath consisting of 14 parts by weight of sulfuric acid, 11 parts by weight of salt cake, 6 parts by weight of formaldehyde and 69 parts by weight of water at 70° C. for 60 minutes and pressed to remove the bath liquid. The resultant was sufficiently washed with a hot water of 40° C. and neutralized and again washed with water of a room temperature. The washed filaments were subjected to scouring treatments such as oiling and cut to give staple fibers of two deniers. The staple fibers were spun and the obtained yarns were woven into a fabric.

The obtained fabric passed completely the flame resistance test provided in DOC-FF 3-71. The fabric was subjected to the vertical flame resistance test provided in AATCC-34-69. In this test, a part of fabric in contact with an igniting flame was decomposed and carbonized, but any flame did not remain after the igniting flame was removed and any glow was not generated. Furthermore, the fabric was subjected to the determination of oxygen index according to the method for determination of oxygen index provided in ASTM-D-2863 to give an oxygen index of 33.4%. This oxygen index shows a sufficient self-fire extinguishing property as a flame resistant fabric.

The fabric was subjected to 50 times washing tests provided in AATCC-135-70 and to 10 times dry cleaning tests provided in AATCC-85-63, respectively. The oxygen index of the fabric after the test is 33.2% as to the washing test and 33.3% as to the dry cleaning test. The results show that the flame resistant property exhibited by the flame resisting agent of the present invention is durable as well as superior.

COMPARATIVE EXAMPLE 1

An aqueous spinning dope was prepared by the same manner as in Example 3 except that the stannic oxide hydrate ($SnO_2 \cdot 0.39 H_2O$) prepared in Example 1 was employed instead of the stannic oxide hydrate ($SnO_2 \cdot 0.63 H_2O$). The spinning dope did not show a serious defect as to its stability but, with respect to its filtering property, its specific KW value is 1.8 which value is beyond the practical range of specific KW value. Furthermore, in the spinning step of the spinning dope, it gave a spinning pressure of 1.9 dg./cm.$^2$ and there occured many breakings of single filament. Thus, it was difficult to carry out practical spinning of the spinning dope.

COMPARATIVE EXAMPLE 2

An aqueous spinning dope was prepared by the same manner as in Example 3 except that the stannic oxide hydrate ($SnO_2 \cdot 0.83 H_2O$) prepared in Example 1 was employed instead of the stannic oxide hydrate ($SnO_2 \cdot 0.63 H_2O$). The stability of the spinning dope was bad and, with respect to its filtering property, its specific KW value is 1.8 which value is beyond the practical range of specific KW value. Furthermore, in the spinning step of the spinning dope, it gave a considerably high spinning pressure of 2.8 kg./cm.$^2$ and there occured many breakings of single filament. Thus, it was difficult to produce an uniform quality of fibers continuously for a long period from the spinning dope.

COMPARATIVE EXAMPLE 3

An aqueous spinning dope was prepared by the same manner as in Example 3 except that the same amount (as metal) of antimony trioxide as the stannic oxide hydrate ($SnO_2 \cdot 0.63 H_2O$) was employed instead of the stannic oxide hydrate ($SnO_2 \cdot 0.63 H_2O$). The specific KW value of the obtained aqueous spinning dope was 2.8, which value shows that antimony trioxide has a very poor dispersibility in the aqueous spinning dope and lowers the filtering property of the aqueous spinning dope.

A staple fiber of two deniers consisting of polyvinyl chloride, polyvinyl alcohol and antimony trioxide [50 : 50 : 2 (as antimony) by weight] was prepared from the aqueous spinning dope by the same manner as in Example 3. The obtained staple fiber was spun into a yarn which was woven into a fabric. The fabric was subjected to the determination of oxygen index according to the same manner as in Example 3 to give an oxygen index of 26.1%.

What we claim is:

1. A process for preparing stannic oxide hydrate substantially amorphous with respect to X-ray diffraction and having bound water in the range from about 0.5 to about 0.7 mole of $H_2O$ per 1 mole of $SnO_2$ which comprises
    a. forming a slurry containing β-stannic acid having a free water content of not more than 70% by weight,
    b. adjusting the slurry to a pH in the range of from about 2 to about 4.5,
    c. heating the slurry to a temperature in the range from 80° C to 130° C in an atmosphere having a humidity of not less than 0.5 kg. of steam/1 kg. of dry air, and
    d. recovering the resulting stannic oxide hydrate product, the product having a free water content of from 5% to 25% by weight and bound water in the range from about 0.5 to about 0.7 mole of $H_2O$ per 1 mole of $SnO_2$.

2. The process of claim 1, wherein said β-stannic acid is prepared by oxidizing metallic tin with nitric acid.

3. The process of claim 1, wherein β-stannic acid is prepared by hydrolyzing stannic chloride with an alkali.

4. The process of claim 1, wherein the β-stannic acid in the slurry has a free water content of 10 to 50% by weight.

5. The process of claim 1, wherein step (c) is carried out so as to give stannic oxide hydrate having a free water content of 7 to 15% by weight.

* * * * *

UNITED STATES PATENT AND TRADEMARK OFFICE
CERTIFICATE OF CORRECTION

PATENT NO. : 4,041,144
DATED : August 9, 1977
INVENTOR(S) : ISAO OBARA ET AL

It is certified that error appears in the above-identified patent and that said Letters Patent are hereby corrected as shown below:

Column 4, Table 1 (4th Column): insert a right parenthesis after "KW value"; and in the equation at line 40 change "10.82" to --18.02--. Column 5, line 47: before "$\beta$-stannic" insert --of--; and in the equation after "Free water content (% by weight" insert a right parenthesis. Column 6, line 17: delete "b" before "5 to 70%". Column 7, line 7: after "5 to 25%" insert --by--; line 34: "hyrate" after "oxide" should read --hydrate--; and line 44: "dispersjion" at the end of the line should read --dispersion--. Column 8, line 42: after "92:8 to" delete "8:". Column 9, line 49: after "jacket and" "subjectd" should read --subjected--. Column 11, line 2: after "bound water" insert --of--; line 6: insert quotation mark before "average"; line 7: insert quotation marks after "PVA"; line 9: insert quotation marks before "average" and after "PVA"; line 13: after "oxide" "hydrated" should read --hydrate--; line 41: insert quotation marks before "power"; line 42: insert quotation marks after "ment" and before "Power"; and line 43: insert quotation marks after "ment". Column 13, line 46: after "1.9" amend "dg." to --kg--. Column 14, line 49: before "$\beta$-stannic" insert --said--; and line 51: "62-stannic" should read --$\beta$-stannic--.

Signed and Sealed this

Ninth Day of May 1978

[SEAL]

Attest:

RUTH C. MASON
Attesting Officer

LUTRELLE F. PARKER
Acting Commissioner of Patents and Trademarks